F. C. FOSTER.
WHEEL.
APPLICATION FILED SEPT. 5, 1908.
975,407.
Patented Nov. 15, 1910.
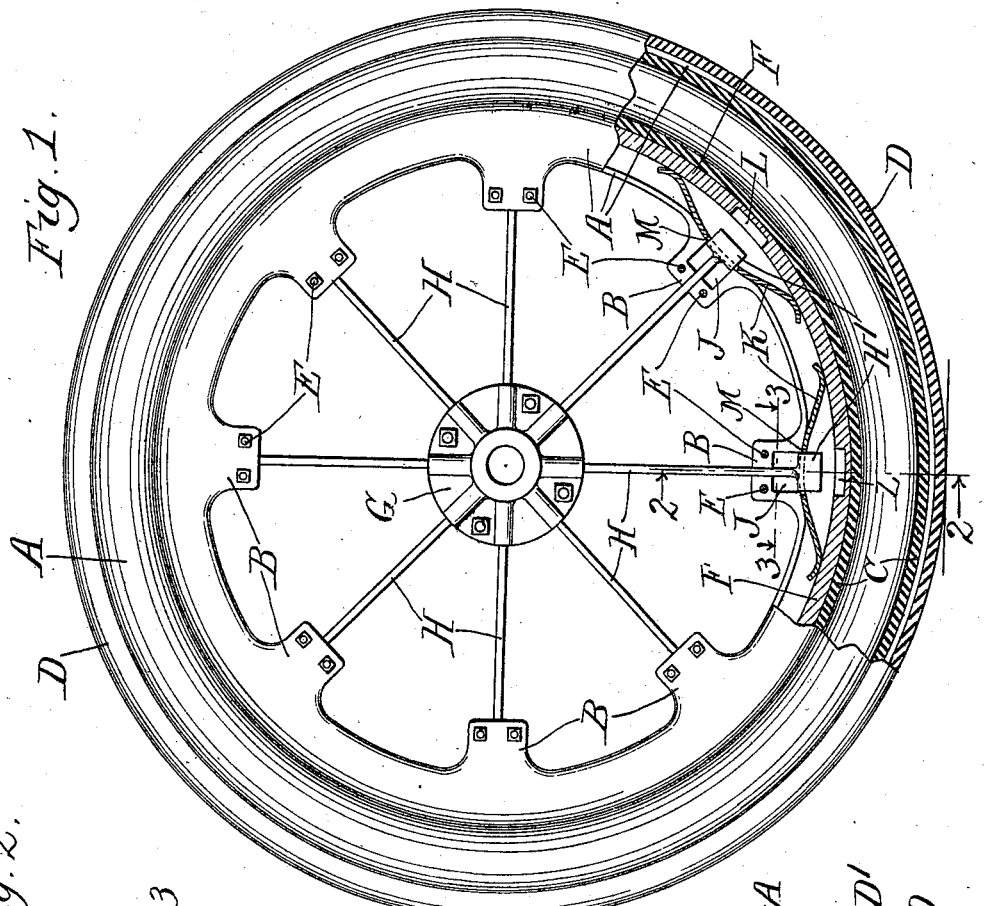
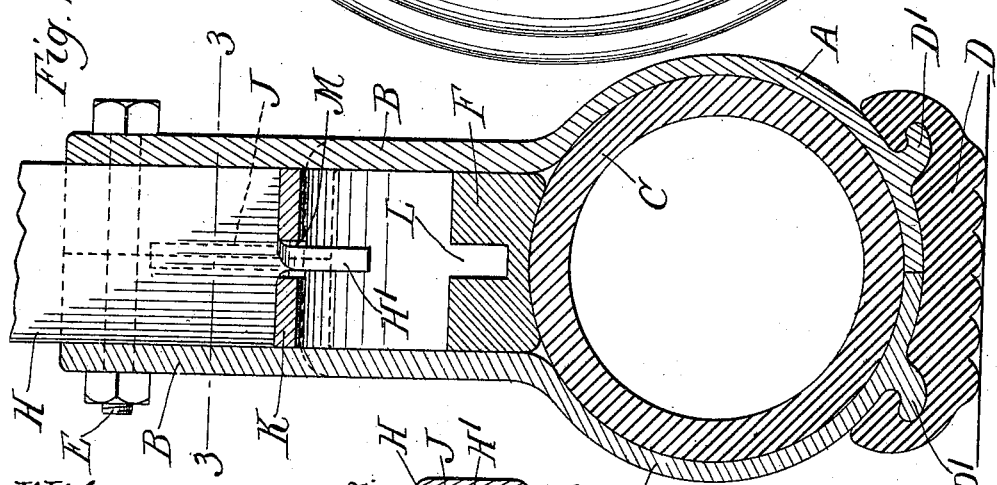
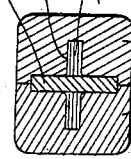
Witnesses
Edward T Wray
Sophie B Werner
Inventor
Freling C. Foster
by Parker & Carter
Attorneys

UNITED STATES PATENT OFFICE.

FRELING C. FOSTER, OF CHICAGO, ILLINOIS.

WHEEL.

975,407.   Specification of Letters Patent.   Patented Nov. 15, 1910.

Application filed September 5, 1908. Serial No. 451,788.

*To all whom it may concern:*

Be it known that I, FRELING C. FOSTER, a citizen of the United States, residing at Chicago, in the county of Cook and State of Illinois, have invented a certain new and useful Improvement in Wheels, of which the following is a specification.

My invention relates to wheels and particularly pneumatic tires therefor, and has for its object to provide a protected pneumatic tire.

It is illustrated in the accompanying drawings, wherein—

Figure 1 is a side elevation of a wheel containing my invention with parts broken away; and Fig. 2, is a detail cross section on line 2—2 of Fig. 1. Fig. 3 is a detail section on line 3—3 of Figs. 1 and 2.

Like parts are indicated by the same letters in all the figures.

I provide a metallic casing consisting of two similar sections each comprising an outer portion A forming half of the tube and each provided with a series of inwardly projecting lugs B, B. C is a pneumatic tube inclosed within the outer portions of these two case sections.

D is a solid tread or tire held in any desired manner on the casing.

I have indicated spreading lugs $D^1$ $D^1$ of which there may be any number properly arranged, whereby the solid tire or tread is held in position on the casing and whereby the two sections of the casing may be held together. They of course may be secured in any desired manner. The case sections are further secured together by means of the transverse bolts E, E which pass through the lugs. These lugs are separated by a considerable distance and are held apart and properly spaced in any desired manner. At the lower and inner portion of these lugs and near the tubular portion of the casing is the solid inner rim F which bears against the inner edge of the pneumatic tire.

G is the hub of the wheel and H, H spokes radiating therefrom. They are preferably thin in cross section and more or less elastic so as to give or yield laterally as hereinafter explained. The lower end of each of these spokes consists of a portion $H^1$ twisted or set at right angles to the main body of the spoke and the lugs are shaped as indicated so as to form between them a space J for the movement of these spoke ends.

K, K are springs shaped preferably as shown and lying inside the flattened portion of the case and resting upon the inner rim F as shown in Fig. 1.

The lugs B, B are shaped so as to leave a slot in which the spokes H can move freely. The inner rim F is also slotted at L to receive the lower end $H^1$ of the spoke.

M is a slot in the spring through which the end of the spoke can be inserted.

It will be understood that the drawings are diagrammatic and also that they are incomplete in the sense that I have omitted many of the minor details of construction which if inserted would only obscure the drawing, but which any mechanic would know how to supply or arrange in any one of many ways to enable him to utilize my invention.

I wish it to be understood that the parts can be greatly changed in shape, form, size and proportion and that some may be omitted and others substituted without departing from the spirit of my invention. All that I have tried by my drawing is to show enough to enable any mechanic familiar with the art to utilize my invention.

The use and operation of my invention are as follows: The casing is in effect a two-part casing having an outer tubular portion and an inner flat portion. In the outer tubular portion lies the pneumatic tire; in the inner flat portion lies the inner rim on which the pneumatic tire rests. This case is formed of two sections which are held together in any desired manner as indicated. I have shown two inwardly projecting lugs arranged together at intervals around the wheel and associated each with the flattened portion of the casing or projecting therefrom. They are slotted to receive the spoke, itself preferably flattened, and they are recessed. The flattened portion of the casing contains a series of springs each of which is connected with its associated spoke so as to move therewith. When the weight is applied to the wheel the tendency is to shorten the distance between the axle or hub and the ground. This applies pressure to the inner side of the pneumatic tire through the solid rim F which is interposed between that tire and the hub. In other words, the axle moves downwardly with reference to the casing for the outer tread, and for this reason the spokes themselves must be slightly elastic so as to yield enough for that purpose.

I have used the term "casing" broadly meaning thereby to include the idea of a pneumatic casing and covering and also to include the idea of an exterior rim to which the spokes are slidably attached.

The twisted ends of the spokes together with the grooves in the rim have a patentable value in that this combination tends to prevent undue movement on the part of the elastic tire and the rim while the tire is under compression.

I claim:

1. In a wheel the combination of a hub with spokes radiating therefrom, said spokes flexible in the plane of the wheel but rigid in a direction perpendicular thereto, a pneumatic tire with an inner supporting rim therefor, a casing for said tire, slidable separate connections between each spoke and the casing, and a spring between the end of the spoke and the inner rim.

2. In a wheel the combination of a hub with spokes radiating therefrom, said spokes flexible in the plane of the wheel but rigid in a direction perpendicular thereto, an exterior casing to which each spoke is separately slidably connected and an interior elastic filling for the casing in opposition to said spokes.

3. In a wheel the combination of a hub with spokes radiating therefrom, said spokes flexible in the plane of the wheel but rigid in a direction perpendicular thereto, an exterior casing to which each spoke is separately slidably connected, an interior elastic filling for the casing and an inner rim interposed between the spokes and the elastic filling.

4. In a wheel the combination of a hub with spokes radiating therefrom, an exterior casing to which each spoke is slidably connected, an inner elastic filling for the casing, an inner rim interposed between the spokes and the elastic filling and a series of springs interposed between the spokes and the inner rim.

5. In a wheel the combination of a hub with spokes radiating therefrom, said spokes flexible in the plane of the wheel but rigid in a direction perpendicular thereto, an exterior tubular casing consisting of two similar sections secured together, apertures in the casing through which the spokes slidably extend, a pneumatic tube within the casing and a spring on the end of each spoke and between such spoke and the tube.

6. In a wheel the combination of a hub with a series of flat spokes with twisted ends, a series of springs held by said ends, an inner supporting rim, and a pneumatic tube between which and the ends of the spokes are interposed said springs, and longitudinal slots in said rim adapted to engage the twisted ends when the springs are compressed and a casing inclosing said rim and said pneumatic tube.

FRELING C. FOSTER.

Witnesses:
  SOPHIE B. WERNER,
  MINNIE M. LINDENAU.